United States Patent [19]

Bock et al.

[11] Patent Number: 5,415,214
[45] Date of Patent: May 16, 1995

[54] COVER DEVICE FOR A MOTOR VEHICLE WINDOW

[76] Inventors: Robert R. Bock, 27 Sumner Ave., Yonkers, N.Y. 10704; Raymond A. Joao, 122 Bellevue Pl., Yonkers, N.Y. 10703

[21] Appl. No.: 192,059

[22] Filed: Feb. 4, 1994

[51] Int. Cl.6 .................................................. B60J 1/20
[52] U.S. Cl. ..................................... 150/168; 296/78.1
[58] Field of Search ...................... 150/166, 168, 154; 296/951, 78.1

[56] References Cited

U.S. PATENT DOCUMENTS

| | | | |
|---|---|---|---|
| 3,042,111 | 7/1962 | Wytovich | 150/168 |
| 3,411,562 | 11/1968 | Garrett | 150/168 X |
| 3,763,908 | 10/1973 | Norman | 150/166 |
| 4,049,036 | 9/1977 | Gebhardt | 150/168 |
| 4,821,785 | 4/1989 | Rolan | 150/166 |
| 4,889,171 | 12/1989 | Minimo | 150/166 |
| 4,973,098 | 11/1990 | McFall | 150/168 X |
| 5,037,156 | 8/1991 | Lundberg | 150/168 X |
| 5,123,468 | 6/1992 | Mates, Jr. | 150/168 |
| 5,193,877 | 3/1993 | George, Jr. | 150/166 x |
| 5,292,167 | 3/1994 | Hellman | 150/168 X |

OTHER PUBLICATIONS

Amtrak TravelMall, Spring 1994, Hammacher Schlemmer product Sun and Snow Shade, Brookstone (publication, cover page and date unavailable).
Carol Wright Gifts, 1994, Magnetic Heavy Duty Windshield Cover, (publication, cover page and date unavailable).

*Primary Examiner*—Gary E. Elkins
*Assistant Examiner*—Christopher J. McDonald
*Attorney, Agent, or Firm*—Raymond A. Joao

[57] ABSTRACT

A cover device for motor vehicle windows and/or lights is disclosed which comprises an external shell which has an inner region and at least two end regions. The cover device also comprises at least two handles, wherein each of the two handles is connected to the external shell at a perimeter region of each of the at least two end regions. The end regions of the external shell is closable inside a motor vehicle passenger compartment. The cover device protects a motor vehicle windows and/or lights from snow, ice, freezing rain, dirt, dust, debris or other foreign matter. The cover device can be used on a windshield, a rear window, side windows and lights of a motor vehicle so as to provide for an easy clearing and cleaning of same.

20 Claims, 12 Drawing Sheets

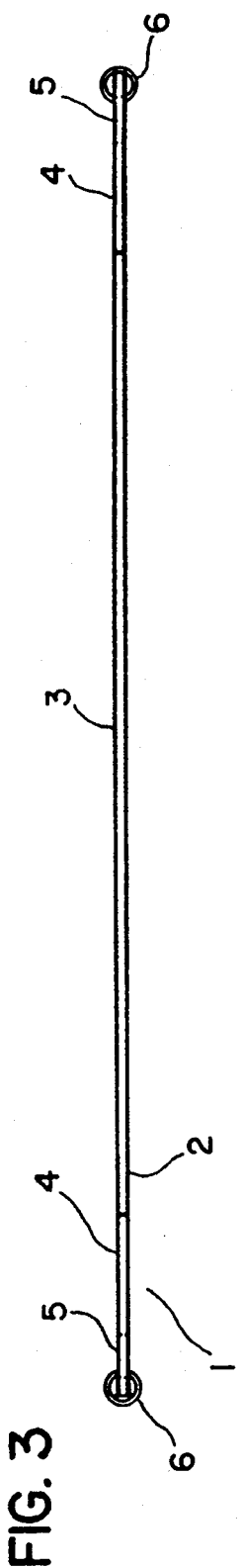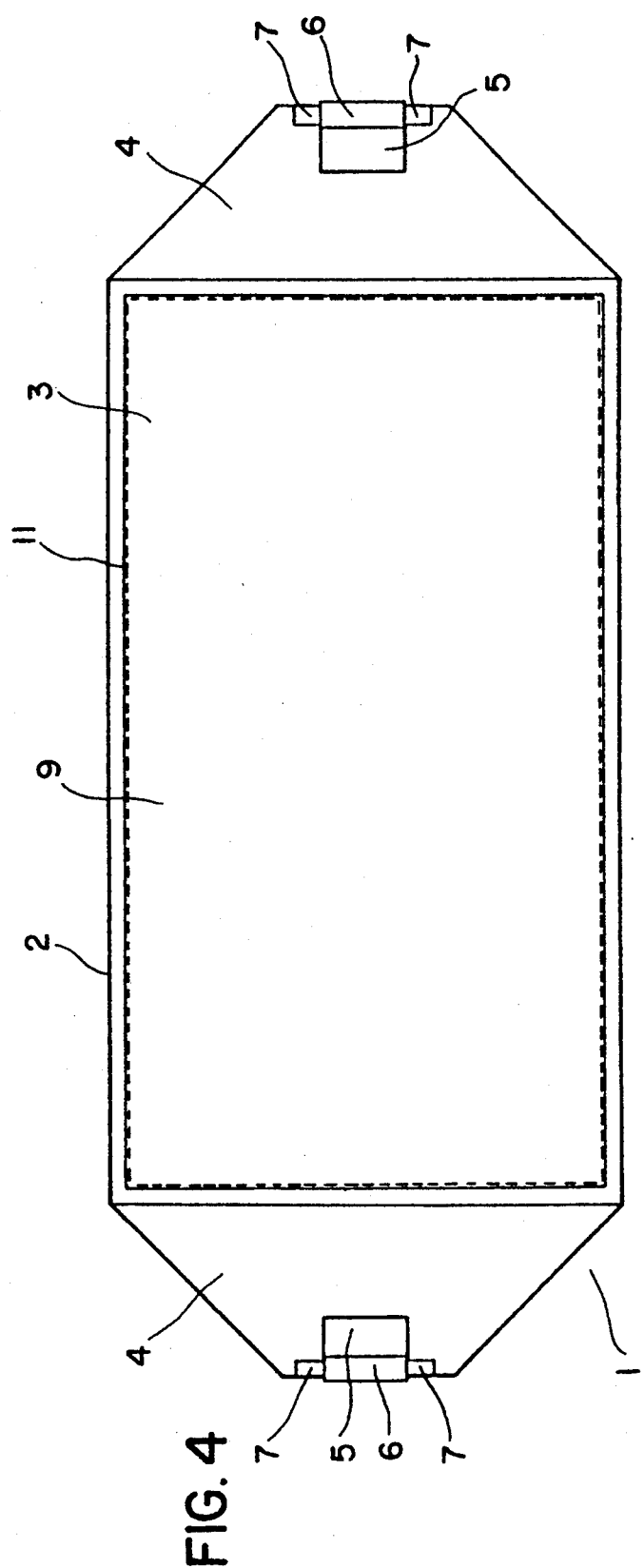

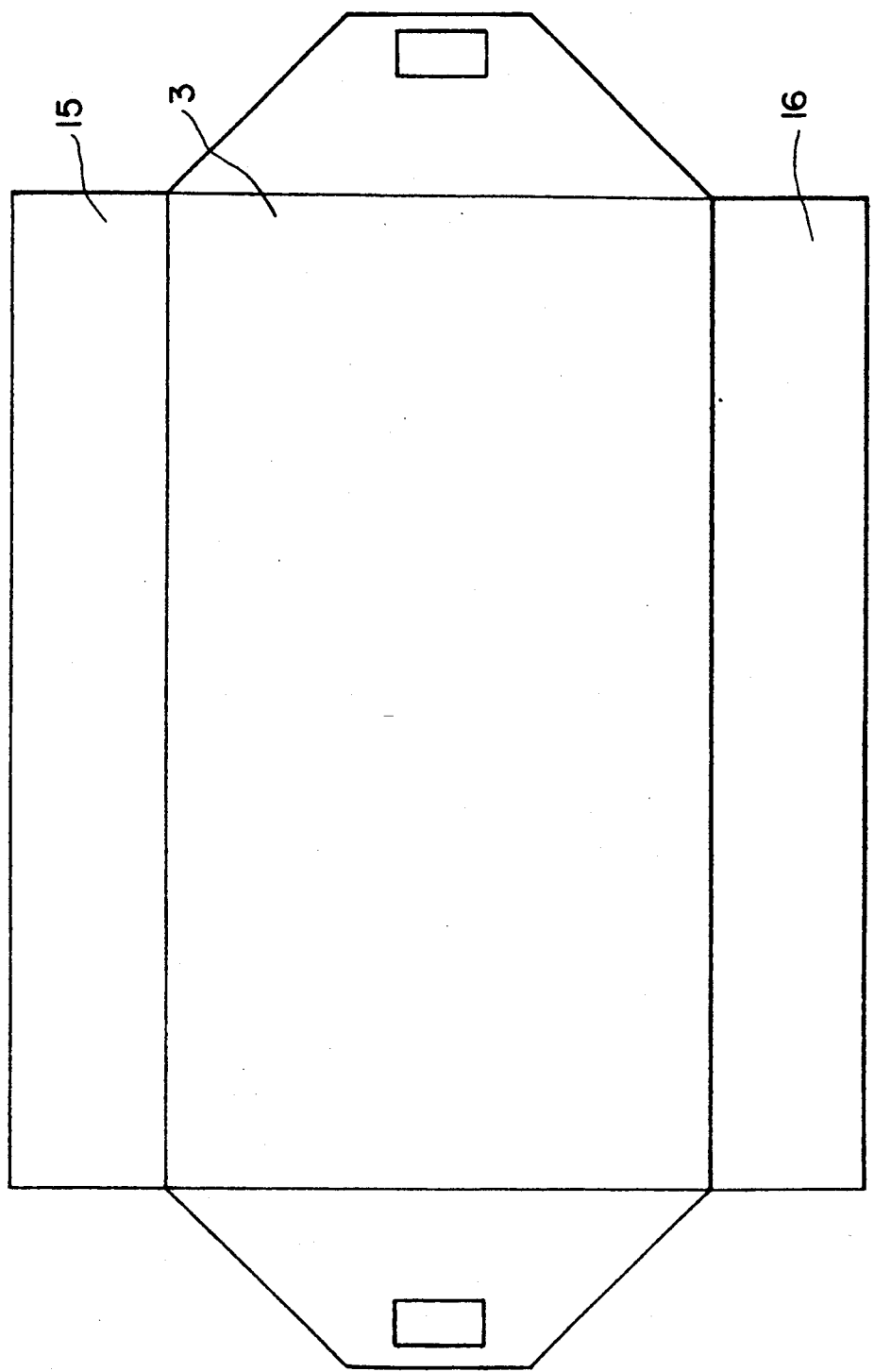

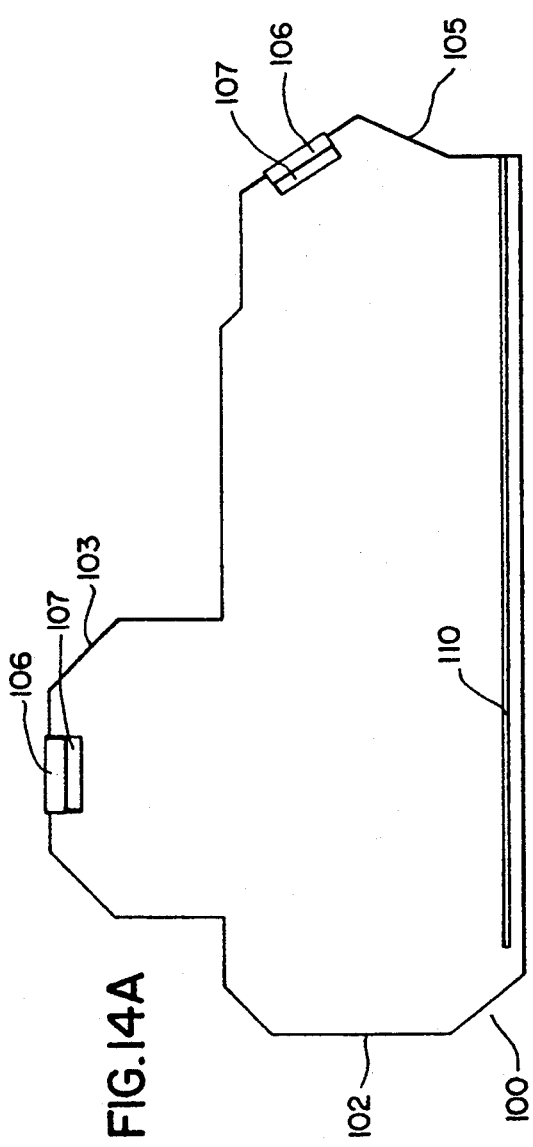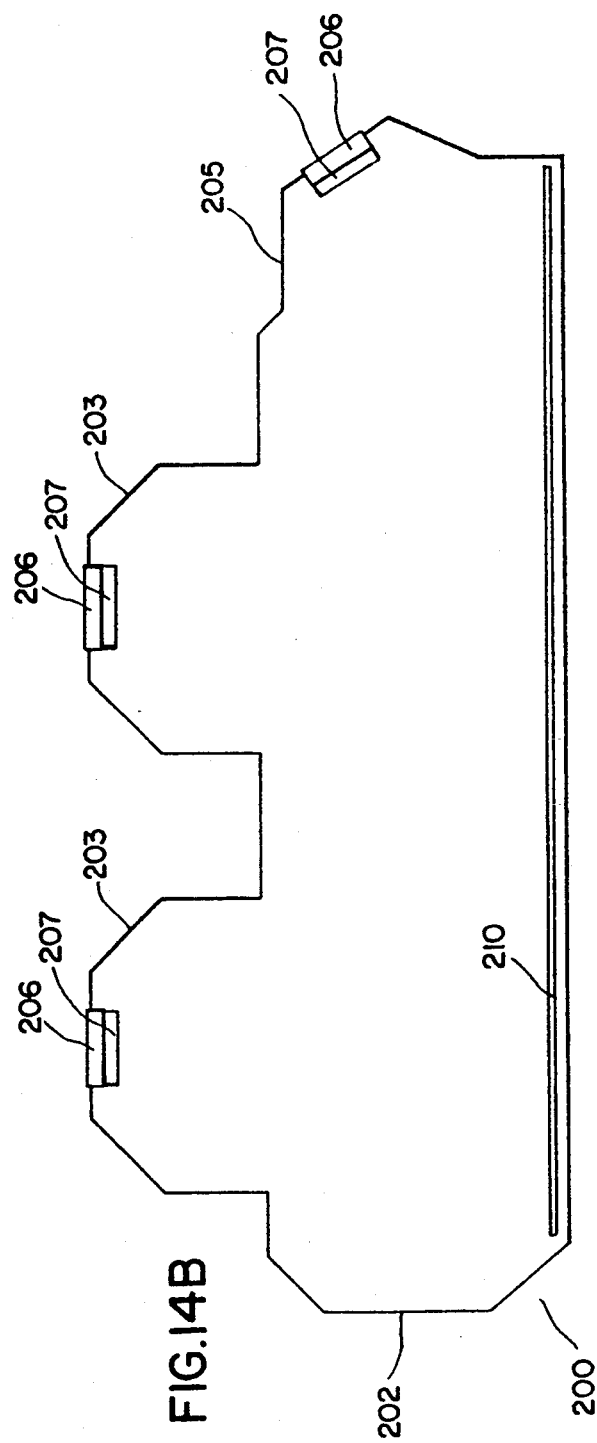

COVER DEVICE FOR A MOTOR VEHICLE WINDOW

FIELD OF THE INVENTION

The present invention pertains to a cover device for motor vehicles, and in particular, to a cover device for motor vehicle windows and/or lights.

BACKGROUND OF THE INVENTION

Clearing and cleaning motor vehicle windows and/or lights, after a snow or ice storm, or merely keeping windows and/or lights clean and clear from dirt, dust and debris can be time-consuming, costly and burdensome and may result in a great deal of wasted time, money and effort. In the case of snow and ice storms, clearing and cleaning motor vehicle windows and/or lights may require a great deal of time and effort prior to safely using the motor vehicle.

Motor vehicle windows must be cleared and cleaned so as to allow the operator to have proper visibility in order to operate the motor vehicle safely. Motor vehicle lights must be cleared and cleaned so as to provide proper light projection so as to allow a proper and safe use of a motor vehicle and, also, so as to provide a means by which to alert other motorists of the presence of the motor vehicle.

Motor vehicle owners and operators generally do not have the time and energy which is required to clear and clean motor vehicle windows an/or lights before using their motor vehicles. This problem is compounded when the owner or operator is caught off guard, without ice and snow scrappers, brushes, or defrosting devices or liquid sprays. As a result, valuable time is wasted prior to motor vehicle use in order to effect a proper clearing and cleaning of windows and/or lights. Further, efforts required in clearing and cleaning windows and/or lights may require owners or operators to remain outside their vehicles, usually in very cold, or other adverse, weather conditions, in order to clear or clean their vehicle windows and/or lights.

While motor vehicle covers are known which cover the entire vehicle, removal of such covers from the motor vehicle, after a snow and/or ice storm, may be very difficult if large amounts of snow and/or ice have accumulated thereon.

SUMMARY OF THE INVENTION

The motor vehicle cover device of the present invention serves to provide a device by which to meet the needs of motor vehicle owners and operators by providing a cover device which protects vehicle windows and/or lights and thereby facilitates an easy clearing and cleaning of same effectively and with minimum effort. In an embodiment of the present invention, the cover device comprises a plastic sheet, reinforced or otherwise, a vinyl sheet, or a canvas sheet. The shell should be strong and durable enough so as to withstand fair to large accumulations of snow and/or ice and should be strong and sturdy enough so as to maintain its integrity during the removal thereof from the vehicle window(s) and/or lights in cases where fair to great amounts of snow and/or ice may have accumulated on the vehicle. The shell should also be flexible and pliable and remain so even during subfreezing temperatures.

The cover device of the present invention may be of any suitable form, shape, or size and may have an inner region and an end region(s). The inner region should be designed so as to completely cover the window and/or lights which are to be protected. The end region(s) should provide a means for securing the cover device to the motor vehicle. The end region(s) may be tapered and may have cutouts therein, adjacent to the perimeter of the cover device. The cutouts may facilitate the grasping and/or the manipulation of the cover device.

The cover device may also have reinforced handles, which may be located at the perimeter thereof, and on the end region(s). The handles may be constructed from shell material, reinforced shell material, or may be constructed from plastic, wood or metal, and may be attached to the cover by any one of a number of appropriate techniques. The handles may be utilized so as to facilitate the grasping and/or the manipulation of the cover device from a window and/or lights of a motor vehicle. It is also important to note that the cover device, or the end region(s) thereof, should be of such a thickness so that it can be closed within a motor vehicle door, window, hood or trunk without affecting the opening and closing operation thereof.

The inner region of the cover device should be long enough so as to extend the full length of the window and/or lights which is to be covered. Further, the inner region should have a width which is larger than the width of the window and/or lights so that the cover device may extend above and below the window and/or lights when the cover is placed across same.

In another embodiment of the present invention, the cover device may also comprise, on its inner side, a lining, which may be made from a cloth, a linen fiber or flannel material, or a chamois material. The lining should be placed adjacent to and/or against the window and/or the lights so as to provide for a non-stick material which is placed adjacent to or against the window and/or lights. The lining should also be absorbent so as to be able to absorb any moisture, rain, sleet, snow, etc., which may enter the spacing between the window and/or lights and the lining of the cover device.

The shell and the lining may be attached, or fused, together by an adhesive material or glue and may be reinforced about the perimeter of the lining, by means such as a stitching, so as to prevent any separation of the shell from the lining, or vice versa. The shell and lining may also be stitched together.

The cover device of the present invention may also be made from one and the same of any of the above-mentioned materials.

The cover device of the present invention may be used to provide for the protection of, and therefore, facilitate the easy clearing and cleaning of, a motor vehicle window and/or lights in the following manner. When it is desired to protect a motor vehicle window, such as a windshield, before or during a snow, ice and/or freezing rain storm, or simply when it is desired to protect the window from dust, dirt, debris or other foreign elements, caused by adverse weather conditions or during prolonged vehicle storage, the cover device may be applied to the window or windshield by placing same across the window or windshield so that the inner region of the cover device covers same.

If a cover with a lining is utilized, the lining should be placed adjacent to or against the window or windshield. The cover device may be arranged so that it extends beyond the window or windshield and onto a portion of the vehicle roof and hood. In this manner, protection of the window or windshield is extended so as to include those portions of the roof and hood which are adjacent the window or windshield. Such an extension onto the hood may also serve to protect the area between the windshield and the hood thereby protecting the vehicle's windshield wiper equipment.

With the cover device placed on the window or windshield, the cover device can be secured to the vehicle by opening the door(s) or window(s) adjacent the covered window or windshield, folding the end regions of the cover device inside the passenger compartment of the motor vehicle, and closing the door(s) or window(s) on the end regions, thereby securing the cover device to the motor vehicle.

It is important to note that the thickness of the cover device, particularly at the end regions, should be of such a size so as to facilitate an easy closing of the door(s) or window(s) with the cover device placed therein. The cover should also be of a sufficient thickness, particularly at its end regions so that same cannot be pulled from the passenger compartment, through the door(s) or window(s). In this manner, the cover device will be safely secured to the motor vehicle.

In order to provide added security, so as to prevent the end regions of the cover device from being pulled from the passenger compartment, an attachment or connecting device may be employed so as to secure the end regions of the cover device to one another, thereby maintaining them together inside the passenger compartment.

The cover may further be secured to the motor vehicle, in the region of the vehicle roof and/or hood by utilizing a securing means such as magnets, suction devices, straps, etc., which may be located at the top and/or bottom portions of the cover device. The securing means may serve to connect the top and/or bottom portions of the cover device to the roof and/or hood, respectively, of the motor vehicle, and may also serve to prevent, or minimize, the entry of snow, ice, rain, dust, etc., or other foreign matter, from entering into the region between the window or windshield and the cover device.

Once the cover device is secured to the motor vehicle, it will protect the windshield or window from snow, ice, rain, or other dust, dirt, debris, or other foreign matter, so as to prevent future accumulations thereof from forming on the windshield or window. This will result in an easier clearing and cleaning of the windshield or window afterwards.

When it is desired to clear or clean the windshield or window, all that is required is that the motor vehicle's door(s) and/or window(s), which secure the cover device to the vehicle, be opened, and the end regions of the cover device be removed from the passenger compartment. The cover device may then be removed by hand or with the aid of an assisting means. Once the cover device is removed from the windshield or window, it may be cleaned off and stored away for later use. The cover device of the present invention serves to protect the windshield or window from accumulations of snow, ice, rain, dust, dirt, debris, or other foreign matter, thereby saving the motor vehicle owner of operator the time, effort and expense, of a tedious and messy clearing and cleaning of the windshield or window. Further, the use of ice scrappers, brushes, defrosting liquids, and/or other clearing or cleaning means, may be minimized or may be completely unnecessary.

In an alternate embodiment of the present invention, the cover device may be provided with handles which may be made from wood, metal, plastic or any other suitable material.

The cover of the present invention may be utilized in a similar, or an analogous, manner for covering the rear windows of a motor vehicle.

In another embodiment of the present invention, the cover device may be utilized for protecting side windows. Embodiments may include cover devices for side windows of two-door, four-door, or other models of vehicles. The cover devices for side windows may be constructed in a manner similar to, or analogous to, the cover devices for windshields and rear windows. In this regard, cover devices for side windows should be comprised of a shell, which may or may not have a lining. These cover devices for side windows are also comprised of top and/or side end regions which may, or may not, have cutouts and/or handles associated therewith.

The cover devices for side windows may also have magnets, suction devices, and/or any other appropriate securing means. The cover devices for side windows may be employed in a manner similar to, or analogous to, the cover devices for windshields and rear windows.

In yet another embodiment of the present invention, the cover device may be adapted to provide protection for the front lights and grill, and/or for the rear lights, of a motor vehicle. Such a front lights/grill, and/or rear lights, cover device also comprises a shell and may, or may not, have a lining. The front lights/grill, and/or rear lights, cover device should also have top end regions and may, or may not, have handles and/or cutouts associated therewith. In addition, such a cover device should have a connecting means for connecting the bottom and/or sides of the cover device to the motor vehicle at appropriate locations on the motor vehicle. Such a connecting means could, for example, connect the cover device to the bumper of the motor vehicle. The connecting means may be a spring-loaded clip, an elastic band, or any other appropriate means.

The cover device may be attached to either the front end or rear end of a motor vehicle, depending upon which portion is to be protected, in order to cover the front lights/grill or the rear lights, respectively.

The cover device for front lights/grill or rear lights may be utilized by opening the vehicle hood or truck, whichever the case may be, connecting the cover device to the front or rear bumper, pulling the cover device tightly and across the portion of the vehicle which is to be protected, inserting the top end region of the cover device inside the motor compartment or trunk, and closing the hood or trunk, respectively, over, or on, the top end regions of the cover device. The cover device may be removed from the vehicle by reversing the above procedure. In this manner, the cover device of the present invention may be utilized to protect the front lights and grill, and/or the rear lights, of a motor vehicle so as to provide for an easy and minimum effort clearing and cleaning of same.

The cover devices of the present invention may take any form, shape, or size, which may be dictated by the specific design of the type or model of motor vehicle upon which it is to be used. In this regard, the cover devices of the present invention may be designed and constructed for use on any of the wide variety of motor vehicles, including passenger cars, trucks, construction equipment, campers, boats, etc., which are presently in existence and which may appear in the future.

Accordingly, it is an object of the present invention to provide a cover device for motor vehicle windows and/or lights for protecting same from snow, ice, freezing rain, dust, dirt, debris and other foreign matter.

It is another object of the present invention to provide a cover device for motor vehicle windows and/or lights which facilitates an easy clearing and cleaning of same.

It is yet another object of the present invention to provide a cover device for motor vehicle windows and/or lights, which provides for a relatively simple application to, and removal from, a motor vehicle.

It is yet another object of the present invention to provide a cover device for motor vehicle windows and/or lights which may be secured to a motor vehicle by placing same inside a vehicle's doors and/or windows.

It is yet another object of the present invention to provide a cover device for motor vehicle windows and/or lights which may dispense with the need for conventional snow and ice scrapping and removal devices and/or defrosting devices and liquids.

It is still another object of the present invention to provide a cover device for motor vehicle windows and/or lights which also serves to protect exterior vehicle systems and mechanisms located adjacent thereto.

It is yet a further object of the present invention to provide a cover device for motor vehicle windows and/or lights which serves to minimize the vehicle owner's or operator's exposure to adverse weather conditions.

Other objects and advantages of the present invention will be made apparent to those skilled in the art upon a review of the Description of the Preferred Embodiment taken in conjunction with the drawings which follow.

BRIEF DESCRIPTION OF THE DRAWINGS

In the Drawings:

FIG. 3 illustrates a top view of the cover device of FIGS. 1 and 2;

FIG. 4 illustrates an alternate embodiment of the cover device of the present invention from a front inner side view;

FIG. 8 illustrates another alternate embodiment of the cover device of the present invention;

FIGS. 14A and 14B illustrate alternate embodiments of cover devices of the present invention which may be used on side windows of a motor vehicle;

DESCRIPTION OF THE PREFERRED EMBODIMENTS

Figure 1:
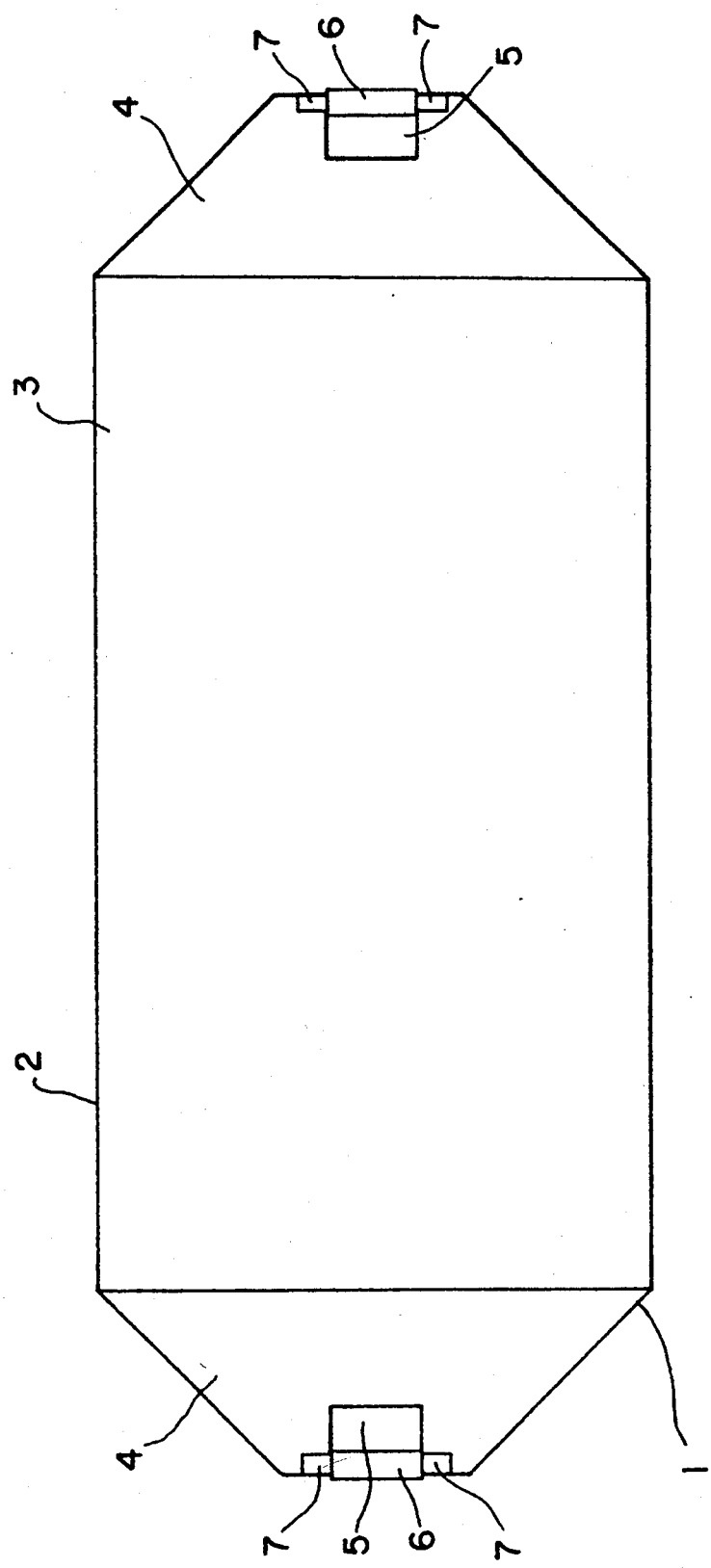
FIG. 1 illustrates a preferred embodiment of the device for motor vehicle windows and/or lights, which is the subject of the present invention.

FIG. 1 illustrates a preferred embodiment of the cover device, which is the subject of the present invention and which is denoted by the reference numeral 1. In the preferred embodiment, the cover device 1 of FIG. 1 is designed for use on a motor vehicle windshield or window. FIG. 1 illustrates a front inner side view of the cover device 1. The cover device 1 comprises a shell 2. In the preferred embodiment, the shell 2 is made of a plastic sheet. The shell 2, however, may also be made of a string or light rope, or other type of, reinforced plastic sheet, a vinyl sheet, or a canvas sheet. The shell 2 should be strong and durable enough so that it can withstand a fair to large accumulation and/or amount of snow and/or ice and should be strong and sturdy enough so as to withstand removal of the cover device 1 from the window of the motor vehicle even though a fair or great amount of snow and/or ice may have accumulated thereon. The shell 2 should also be, and remain, flexible and pliable even under severe weather conditions and/or subfreezing temperatures so that it may be utilized in the manner described hereinbelow.

In the preferred embodiment, the cover device 1 is illustrated as having the shape or form as shown in FIG. 1. However, the cover device 1 may take any form, shape, or size. In FIG. 1, the cover device 1 is illustrated as having a rectangular inner region 3 and tapered end regions 4 on both sides of the inner region 3. At the perimeter of each of the tapered end regions 4, there are cutouts 5 in the cover device 1, which cutouts 5 are adjacent to the perimeter of the cover device 1 as shown in FIG. 1. The cutouts 5 facilitate the grasping and manipulation of the cover device 1 so as to provide for its easy removal from a motor vehicle windshield or window as will be described hereinbelow.

The cover device 1 also comprises handles 6, which may be reinforced handles and, which are located at the perimeter of the cover device 1, on each of the end regions 4, as shown in FIG. 1. In the preferred embodiment, the handles 6 may be reinforced extensions of the shell 2, which may simply be additional shell material which is stitched to the cover device 1, at regions 7, as illustrated in FIG. 1. The handles 6 may alternately be plastic, wooden, or metal handles which may be attached to the cover device 1 at the regions 7 by any one of a number of appropriate attachment means or techniques. The handles 6 are utilized so as to facilitate the grasping and manipulation of the cover device 1 such as when it is to be removed from a windshield or window of a motor vehicle. The handles 6 should be strong enough and should be secured to the cover device 1 so as to facilitate the removal of the cover device 1 from the motor vehicle windshield or window while maintaining the integrity of the cover device 1.

It is also important to note that the cover device 1 should have a thickness which is such that it may be closed inside or within a motor vehicle door or window in the manner to be described hereinbelow, and further, so that it does not interfere with the opening or closing of the door or window.

Figure 2:
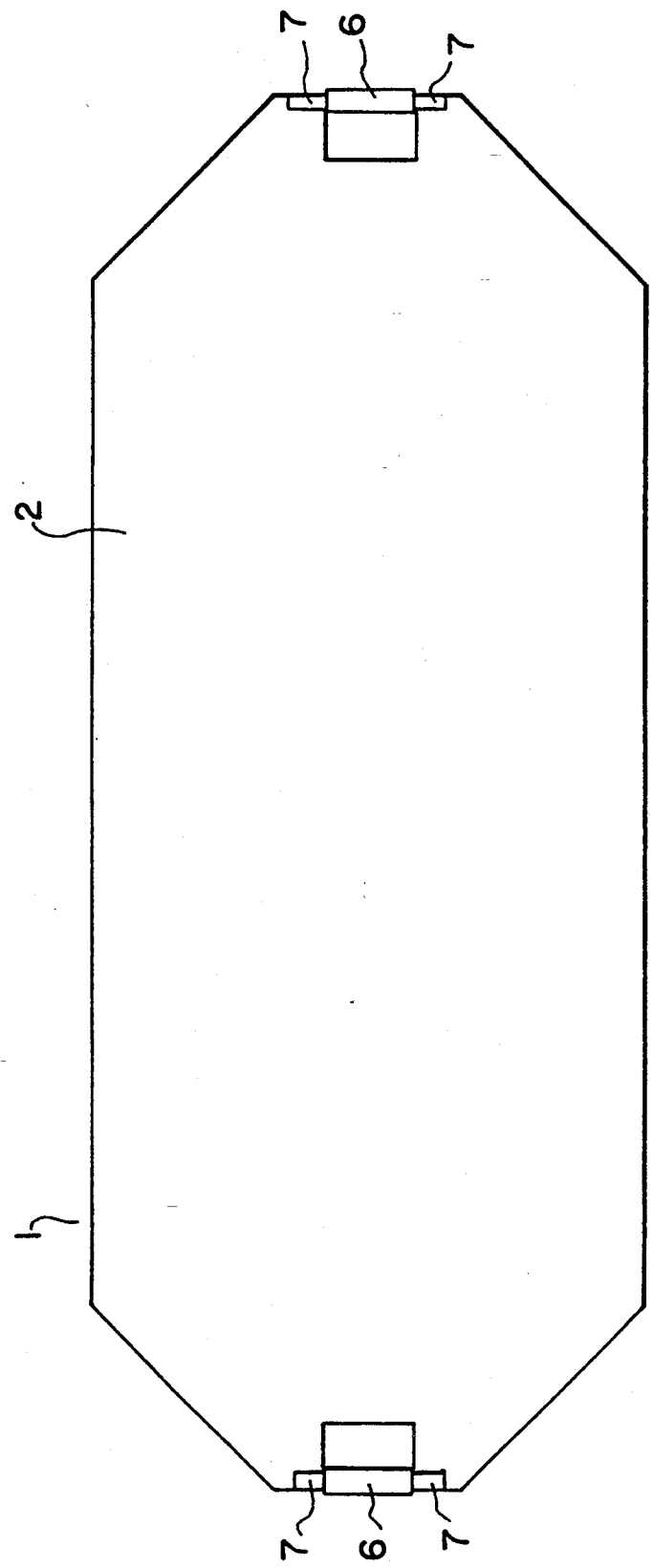
FIG. 2 illustrates a front exterior side view of the cover device of FIG. 1.

While FIG. 1 illustrates the preferred embodiment of the cover device 1 of the present invention, from a front inner side view, FIG. 2 illustrates the cover device 1 from a front exterior side view. The exterior side of the shell 2 may be blank or may have a trademark, logo, or other symbol, etc., printed thereon.

Referring once again to FIG. 1, the inner region 3 of the cover device 1 should be long enough so as to extend the full length of the motor vehicle windshield or window which is to be covered. Further, the inner region 3 should have a width which is as large as or larger than the width of the windshield or window so that the inner region extends beyond the top of the windshield or window and onto the vehicle roof and beyond the bottom of the windshield or window and onto the vehicle hood.

FIG. 3 is an illustration of the cover device 1 from a cross sectional or top view which illustrates the above-described components of the cover device 1.

FIG. 4 illustrates an alternate embodiment of the cover device 1 of the present invention, from a front inner side view. The cover device 1 of FIG. 4 comprises a shell 2, which is an external shell. As in the cover device 1 of FIG. 1, the shell 2 of FIG. 4 is also made of a plastic sheet and may also be made of a string or light rope, or other type of, reinforced plastic sheet, a vinyl sheet, or a canvas sheet.

The cover device 1 of FIG. 4 also comprises, on its inner side, a lining 9, which is preferably a cloth lining and which may also be made of a linen fiber or flannel material or a chamois material. The lining 9 may also be made of any other suitable material which may be placed adjacent to and/or against the windshield or window, or other metal or plastic components of the motor vehicle, so as to provide for a non-stick material which may be placed adjacent to, or against, the windshield or window or other motor vehicle part.

The lining 9 should also be absorbent so as to be able to absorb any moisture, liquids, rain, sleet, snow, etc., which may exist in, or which may enter into, any spacing which may exist between the windshield or window and the lining 9 of the cover device 1. The lining 9, and the external shell 2, in either of the embodiments of FIGS. 1 and 4, should be of a material which will prevent the cover device 1 from freezing to the windshield or window. In the embodiment of FIG. 4, the lining 9 is shown as being of the same size and shape as the inner region 3 of the shell 2. The lining 9 may, however, also extend, and may be of a size and shape which approximates, or which is equal to, the full size and shape of the shell 2. The lining 9 may also be located only on portions of the cover device 1 and may serve to protect the vehicle body parts, over which it may extend, from being scratched.

In the embodiment of FIG. 4, the shell 2, and the lining 9 are attached, or fused, together by an adhesive material or glue, and may be reinforced about the perimeter of the lining 9 by a stitching 11, so as to prevent any separation of the shell 2 from the lining 9, or vice versa, during use. The shell 2 and the lining 9 may also be stitched together in any other appropriate manner, such as throughout the area of the cover device 1, or the inner region 3. In this manner, the shell 2 and the lining 9 will remain connected back-to-back against one another.

Figure 5:
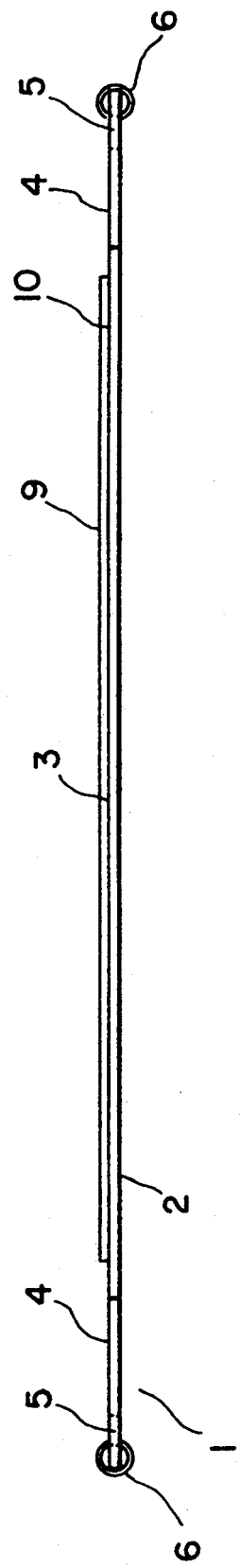
FIG. 5 illustrates the cover device of FIG. 4 from a cross sectional or top view.

FIG. 5 illustrates the cover device 1 of FIG. 4, from a cross sectional, or top, view. FIG. 5 illustrates the shell 2, the lining 9, and the adhesive material or glue 10. With the exception of the addition of the lining 9 in FIGS. 4 and 5, the cover device of FIGS. 1-5 comprise the same components.

While the cover device 1 of the present invention is described above as being comprised of a plastic, a reinforced plastic, a vinyl, or a canvas sheet and may also include a cloth, linen fiber, flannel material, or chamois, lining, the entire cover device 1 may be made from one and the same of any of the above-described materials, provided that the material is suitable and appropriate for the intended use.

Regardless of how the cover device 1 of the present invention is constructed, the thickness of the cover device 1, particularly at the tapered end regions 4, must be such that the end regions 4 may be closed within or inside a motor vehicle door or window, in the manner which will be described hereinbelow, without interfering with the closing or opening of the door or window.

The cover device 1 of the present invention may be used to provide for the protection of a motor vehicle windshield, windows and/or lights, and therefore, facilitate and provide for an easy clearing and cleaning of same as described below.

Figure 6:
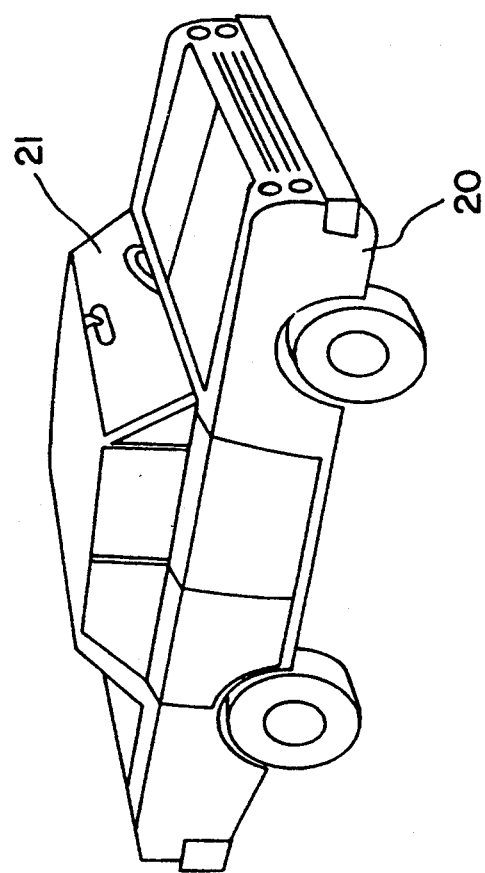
FIG. 6 illustrates a typical motor vehicle upon which the cover device of the present invention may be utilized.

FIG. 6 illustrates a typical automobile 20 having a windshield 21 upon which the cover device 1 of the present invention may be utilized. In the preferred embodiment, an automobile is shown in FIG. 6. However, the cover device 1 of the present invention, may also be utilized on and in conjunction with, any type of motor vehicle including, automobiles of any size, model, type, shape or form. The cover device 1 may also be utilized on, and in conjunction with, light trucks, heavy trucks, recreational vehicles, construction equipment, campers, boats, etc. In the preferred embodiment, the cover device 1 of the present invention is described as being utilized for protecting the windshield 21 of the automobile 20. As will be described hereinbelow, the cover device 1 of the present invention may also be adapted for use on rear windows, on side windows, and/or on lights.

The cover device 1 of the present invention may be utilized in the following manner. When it is desired to protect a motor vehicle windshield, such as before or during a snow, ice and/or freezing rain storm, or to protect the windshield from dust, dirt, debris, or other foreign matter, such as during adverse weather conditions, during instances when the motor vehicle may be exposed to large amounts of dust or dirt, or when a motor vehicle is placed in storage, the cover device 1 of the present invention may be applied to the window or windshield 21 of the vehicle 20 as described below with reference to FIGS. 7A and 7B.

Figure 7A:
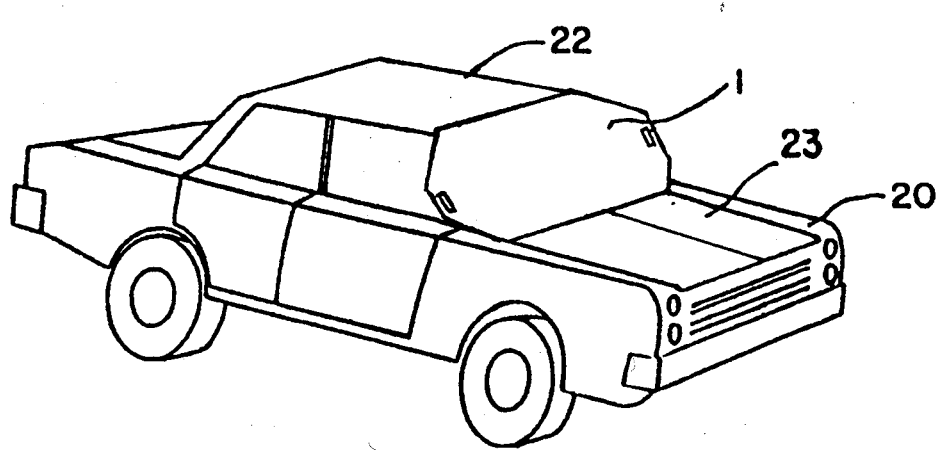
FIGS. 7A and 7B illustrate a typical application of the cover device, of the present invention, to the windshield of the motor vehicle of FIG. 6.

As shown in FIG. 7A, the cover device 1 is laid across the windshield 21 of the motor vehicle 20 so that the inner region 3 of the cover device 1 covers the entire windshield 21. If the cover device 1 of FIGS. 4 and 5 is utilized, the lining 9 of the cover device 1 should be placed adjacent to, or against, the windshield 21. The cover device 1 should also be arranged on the windshield 21 so that it extends beyond the top of the windshield 21 and onto a portion of the roof 22 of the motor vehicle 20. The cover device 1 should also be arranged so that it extends beyond the bottom of the windshield 21 and onto a portion of the hood 23 or into the region between the bottom of the windshield 21 are the hood 23. In this manner, the protection of the windshield 21 is extended to include the front portion of the roof 22 and either the portion of the hood 23 adjacent the windshield and/or the area between the windshield 21 and the hood 23. In this manner, the cover device 1 may also serve to protect the windshield wiper equipment (not shown) of the vehicle.

Figure 7B:
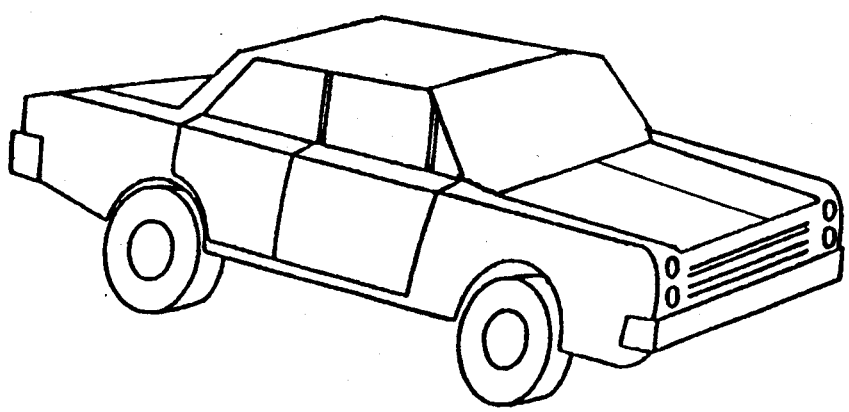

Referring once again to FIG. 7A, the cover device 1 is placed on the windshield 21 of the vehicle 20 so that its inner side, or lining 9 side if such embodiment is employed, lies against, or adjacent to, the windshield 21. With the cover device 1 placed on the windshield 21, as shown in FIG. 7A, the cover 1 is secured thereto by opening each of the doors 26 of the motor vehicle, or by opening the windows, if such is the case, and by folding the tapered end regions 4 inside the passenger compartment of the motor vehicle. The motor vehicle's doors, or windows, are then closed on the tapered end regions 4 of the cover device 1 thereby securing the cover device 1 to the motor vehicle while covering the windshield 21. FIG. 7B illustrates the motor vehicle with the cover device 1 attached thereon.

It is important to note that the thickness of the cover 1, particularly at the tapered end regions 4, should be of such an appropriate size, so that the door or windows open and close without difficulty. Further, the thickness of the cover device 1, particularly at the end regions 4, should be of such an appropriate size so as to prevent the tapered end regions 4 of the cover device 1 from being pulled through the closed door or window and out of the passenger compartment. In this manner, the cover device 1 may be secured to the motor vehicle while providing the desired protection for the windshield 21.

In order to provide additional protection for those portions of the roof and/or hood, which are adjacent the windshield 21, and so as to include protection of the windshield wiper equipment, the cover device 1 may be constructed as illustrated in FIG. 8 so as to an include inner region 3 which has an extended top portion 15 and an extended bottom portion 16. While FIG. 8 illustrates a cover device 1 which has a top portion 15 and a bottom portion 16, the cover device 1 may be constructed so as to have only a top portion or only a bottom portion.

Figure 9A:
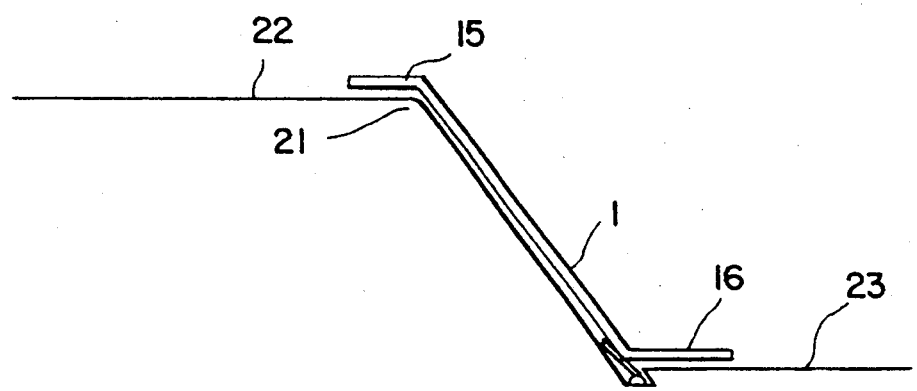
FIGS. 9A and 9B illustrate a typical placement of the cover device of FIG. 8 upon a motor vehicle.
Figure 9B:
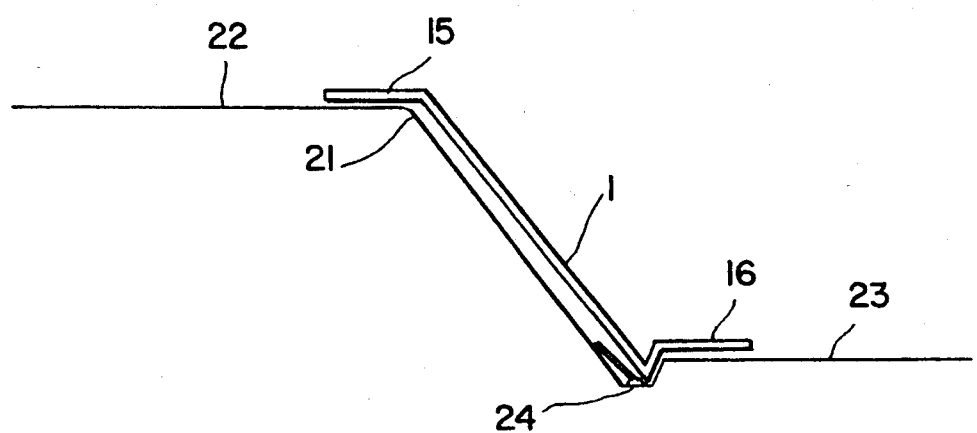

FIGS. 9A and 9B illustrate two possible manners in which the cover device 1 of FIG. 8 may be placed on the motor vehicle. In FIG. 9A, the cover device 1 is shown placed on the vehicle so that the top portion 15 extends onto the roof 22 of the vehicle and so that the bottom portion 16 extends onto the hood 23 of the vehicle. In FIG. 9B, the cover device 1 is shown as being placed on the vehicle so that the top portion 15 extends onto the roof 22 of the vehicle and so that the bottom portion 16 is folded, as shown, into the area between the windshield 21 and hood 23 so as to protect the windshield wiper equipment 24.

Figure 10:
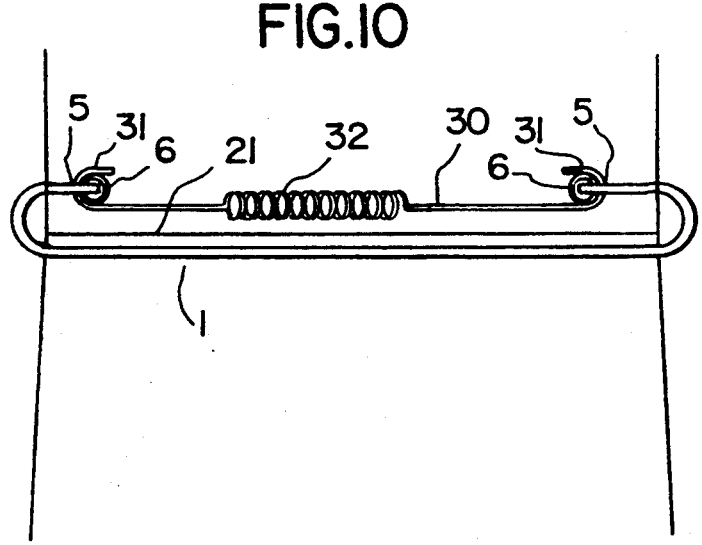
FIG. 10 illustrates, from a top view perspective, the cover device of the present invention which is used in conjunction with a connecting device.

In order to prevent the tapered end regions 4 of the cover device 1 from being pulled through the door(s) or window(s) and from the motor vehicle passenger compartment, an attachment device may be employed so as to secure the tapered end regions 4, of the cover device 1, to one another. FIG. 10 illustrates use of a connecting device 30, from a top view perspective.

In the embodiment of FIG. 10, a spring-loaded attachment device 30 is utilized which has hooks or connectors 31 at its ends and a spring or tension device 32 at its center region. The tension device 32 serves to provide tension to pull the ends of the device 30 together. The hooks or connectors 31 are attached around each handle 6, of the cover device 1, and through each cutout 5, as shown in FIG. 10, so as to secure the tapered end regions 4 of the cover device 1 to one another and thereby preventing their being pulled from the passenger compartment. While connecting device 30 is described, it is envisioned that any other suitable connecting device or means may be employed so as to provide added securedness for the cover device 1.

Figures 11A, 11B:
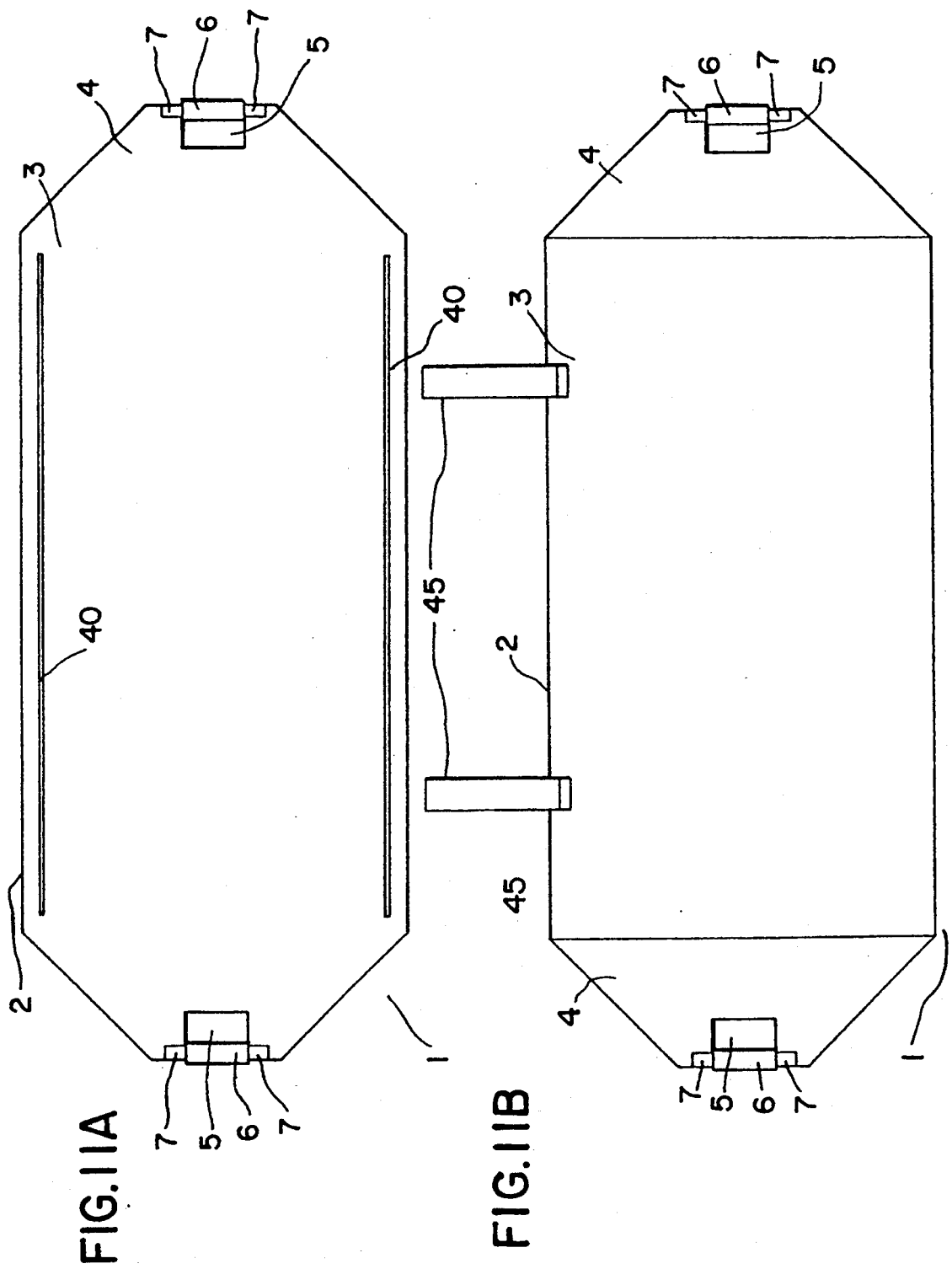
FIG. 11A illustrates an alternate embodiment of the cover device which utilizes a securing means which is constructed into or attached to the cover at the regions shown.
FIG. 11B illustrates an alternate embodiment of the cover device of FIG. 11A which employs straps as a securing means.

The cover device 1 may be further secured to the motor vehicle by utilizing a securing means such as flexible magnetic stripping or other magnets, suction devices, straps, etc., which may be constructed into, or attached to, the cover device 1 at the top and/or bottom portions of the inner region 3. FIG. 11A illustrates the cover device 1 which further comprises flexible magnetic stripping 40 which is sewn into the inner region 3 along the top and bottom perimeters thereof. While FIG. 11A illustrates the cover device 1 of the present invention as utilizing a flexible magnetic stripping 40, it is important to note that other magnets, suction devices and/or straps may also be utilized so as to provide added securedness of the cover device 1 to the vehicle. In FIG. 11A, the flexible magnetic stripping 40 connects the top and/or bottom portions of the cover device 1 to the roof and/or hood of the motor vehicle so as to further secure same to the motor vehicle, and so as to minimize the entry of snow, ice, sleet, rain, dust, dirt or debris, or other foreign matter, within the region between the windshield and the cover device 1.

It is also possible to employ straps or other connecting means which may be attached to the cover device 1 such as is shown in FIG. 11B. In FIG. 11B, the straps 45, which are shown at the top of the inner region 3, may be employed so as to connect the cover device 1 to the motor vehicle, such as for example, at the vehicle's roof rack.

Once the cover device 1 is secured to the motor vehicle, it will serve to protect the windshield or window from snow, ice, freezing rain, or other dust, dirt, debris or other foreign matter. When it is desired to clear or clean the windshield 21 or window, such as after a storm, or when it is desired to use the motor vehicle, the motor vehicle's door(s) or window(s), whichever the case may be, must be opened, any attachment device 30, if utilized, must be removed, and the cover device 1 may then be pulled, via its handles 6 or by its end regions 4, from the windshield 21.

While no additional pulling means may be needed for removing the cover device 1 of the preferred embodiment, it is possible to utilize a removal assisting means (not shown), such as a pole having a hook, or other suitable grasping means, on its end, which could be attached to, or be used to grasp, the cover device 1, such as by the handles 6, and through the cutouts 5. By using such a removal assisting means, an individual may simply walk around the front of the motor vehicle, while holding onto and/or pulling the removal assisting means, so as to remove the cover device 1 from the vehicle.

Once the cover device 1 is removed from the windshield 21, it may be wiped, brushed, or shaken clean, and may be folded and stored away for later use. Use of the cover device 1 of the present invention serves to protect the windshield 21 or window of the motor vehicle from accumulations of snow, ice, freezing rain, dust, dirt, debris, or other foreign matter, thereby saving the motor vehicle owner or operator the time and expense of a messy and tedious clean-up. As a result, use of ice scrappers, brushes, defrosting devices and/or liquids may be minimized or may be unnecessary.

Figure 12:
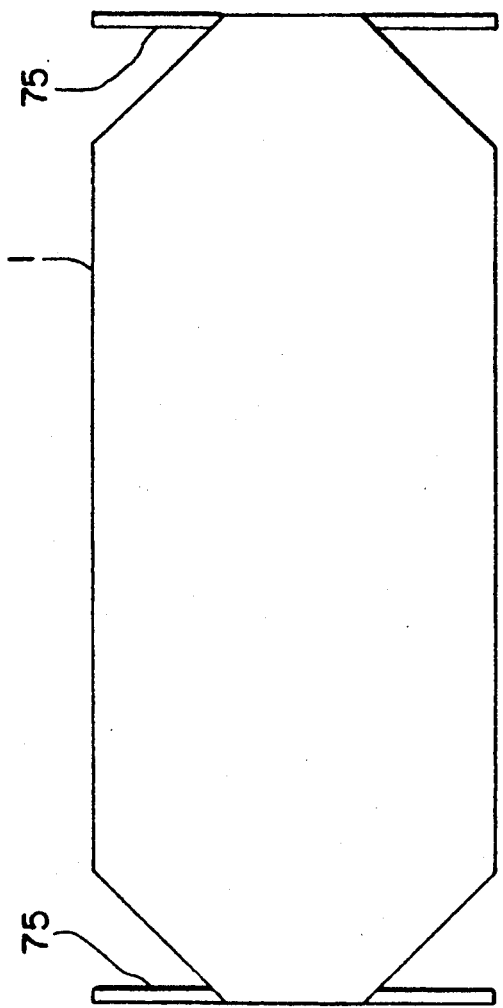
FIG. 12 illustrates yet another alternate embodiment of the cover device of the present invention.

In yet another alternate embodiment of the present invention, which is illustrated in FIG. 12, the cover device 1 is provided with handles 75, which may be wooden, metal or plastic handles, or which may be made from any other suitable material. Use of the cover device 1 of the embodiment of FIG. 12 may dispense with the need for cutouts. Further, the use of handles 75, as disclosed in FIG. 12, may also provide a means for further securing the cover device 1 inside the motor vehicle passenger compartment as the handles 75, which have an increased thickness, could not be pulled through closed doors or windows of the motor vehicle.

Figure 13:
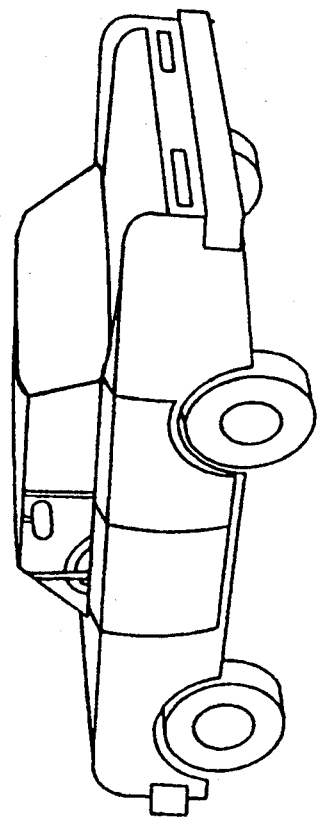
FIG. 13 illustrates use of a cover device of the present invention on a rear window of a motor vehicle.

The cover device 1 of the present invention may also be utilized in a similar, or in an analogous, manner for covering and protecting the rear window or other windows of a motor vehicle. FIG. 13 illustrates use of the cover device 1 on a rear window of a motor vehicle.

FIGS. 14A and 14B illustrate an alternate embodiment of the cover device of the present invention which may be utilized for protecting the side windows of a motor vehicle. FIG. 14A illustrates a cover device 100 which may be employed on the side windows of two-door motor vehicles. FIG. 14B illustrates a cover device 200 which may be employed on the side windows of four-door motor vehicles. The covers 100 and 200 of FIGS. 14A and 14B, respectively, may be constructed in the same, or a similar, manner as the cover device 1. In this regard, the cover devices 100, 200 may comprise shells 102, 202, respectively, and they may, or may not, have linings (not shown). Further, the cover devices 100, 200 may have tapered top regions 103,203, and/or tapered side end regions 105, 205, cutouts 107, 207, and handles 106, 206, respectively. The cover devices 100, 200 may also have a securing means 110, 210 which may comprise any one or any combination of the above described securing means. The securing means may serve to connect the cover device 100, 200 to the motor vehicle.

While FIGS. 14A and 14B illustrate a typical shape for the cover devices 100, 200, it is important to note that they may be of any appropriate form, shape, or size, which may be dictated by the application and/or the specific design of the motor vehicle, upon which it is to be utilized. The cover devices 100, 200 may also be designed so as to extend to the doors or other body parts of the motor vehicle and may be secured thereto by any appropriate securing means.

The cover devices 100, 200 may be utilized and placed on the motor vehicle by inserting the top end regions 103, 203 and/or the side regions 105, 205, into an open door(s) and/or window(s) and closing the door(s) and/or window(s) on same, in the manner described above, with regards to the cover device 1. In this manner, the top end region(s) 103,203 or the side end region(s) 105, 205 will be secured within the motor vehicle passenger compartment, in the manner described above. The cover devices 100, 200 may further be secured to the door or body of the motor vehicle by any suitable securing means as described above.

The covers 100, 200 may be removable from the motor vehicle in the same, or in an analogous, manner as the cover device 1 for a windshield or for a rear window as described above. Specifically, the door(s) and/or window(s) of the motor vehicle must be opened and the top end region(s) 103, 203 and/or the side end region(s) 105, 205 of the cover device must be removed from the passenger compartment. In this manner, the cover devices 100, 200 may be utilized in order to provide protection for side windows and to facilitate an easy and minimum effort clearing and cleaning of same.

Figure 15:
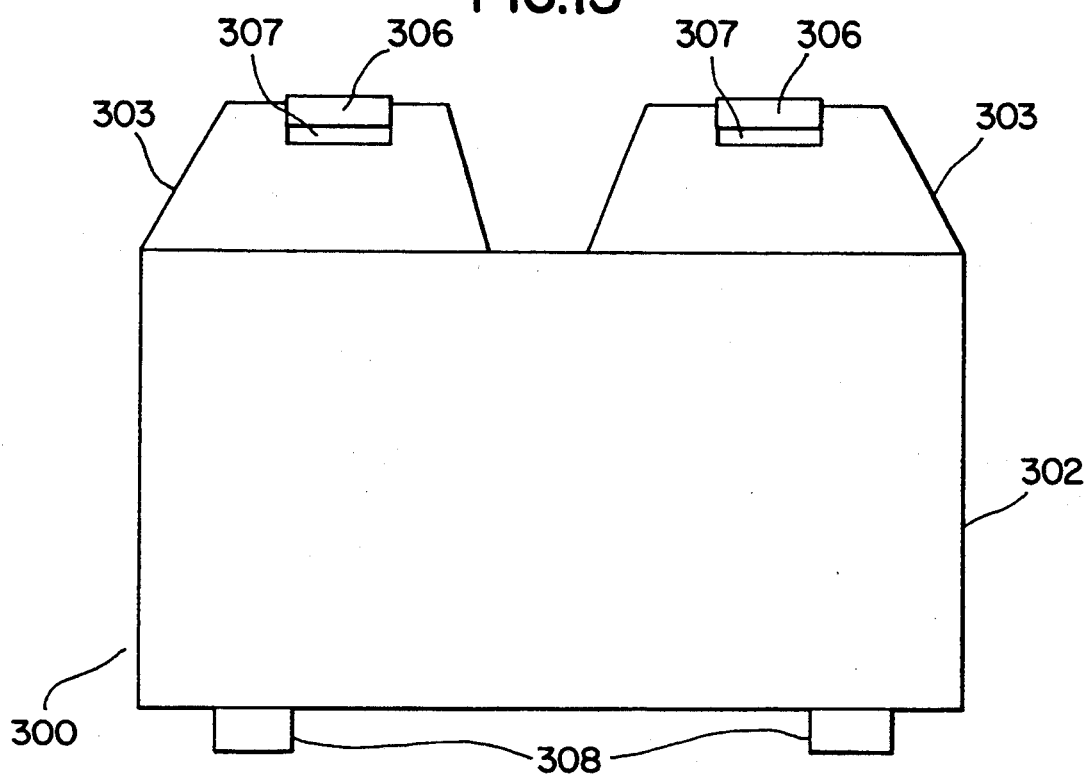
FIG. 15 illustrates an alternate embodiment of the cover device of the present invention which may be utilized to protect a motor vehicles lights and/or grill.

In yet another embodiment of the present invention, the cover device may be adapted to provide protection, and to serve as a cover, for the front lights and/or grill, and for the rear lights, of a motor vehicle. FIG. 15 illustrates a cover device for use in protecting a motor vehicle's front lights and/or grill. In FIG. 15, the cover device is denoted by the reference numeral 300.

Figure 15A:
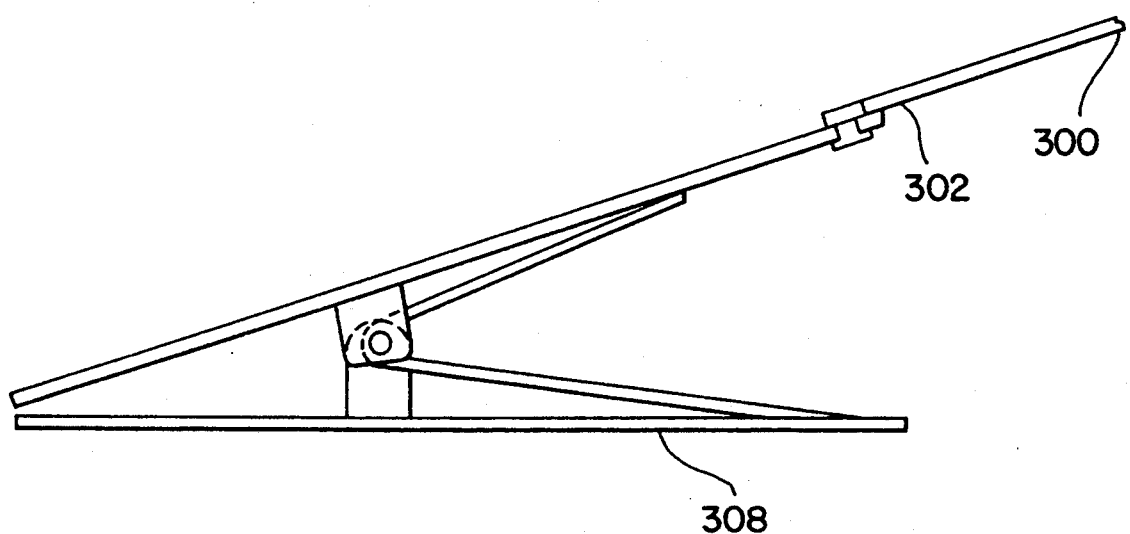
FIG. 15A illustrates a typical connecting device which is utilized in conjunction with the cover device of FIG. 15.

As shown in FIG. 15, the cover device 300 comprises a shell 302 and may, or may not, comprise an inner lining (not shown). As in the above described embodiments, the cover device 300 also comprises top end regions 303, handles 306, and cutouts 307. In addition the cover device 300 has a connecting device(s) 308 which, in the preferred embodiment, is a spring loaded clip, which is shown in more detail in FIG. 15A. In FIG. 15A, the device 308 is attached to the shell 302 of the cover device 300. The connecting device 308 is connectable to the bumper of the motor vehicle. The connecting device 308 may also be an elastic band, or strap, or any other suitable means which may be attached to the bumper or to any other suitable part of the motor vehicle.

The cover device 300 may be attached to the front end of a motor vehicle, thereby covering the headlights, and other lights. The cover device 300 may also be utilized to protect the vehicle front grill. The cover device 300 may also be attached to the rear end of the motor vehicle so as to provide protection for the rear lights of same.

Figure 16A:
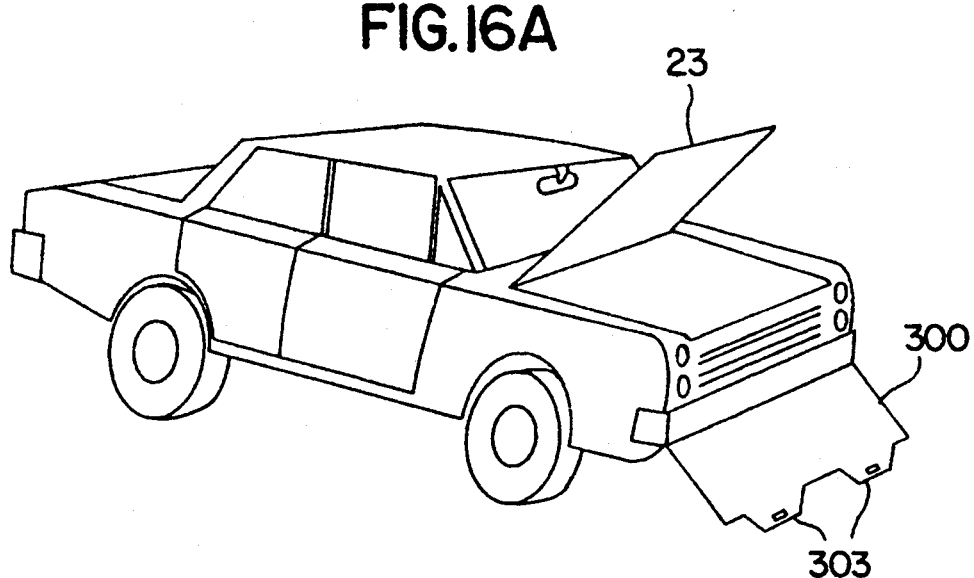
FIGS. 16A–16C illustrate the manner in which the cover device of FIG. 15 may be attached to a motor vehicle.
Figure 16B:
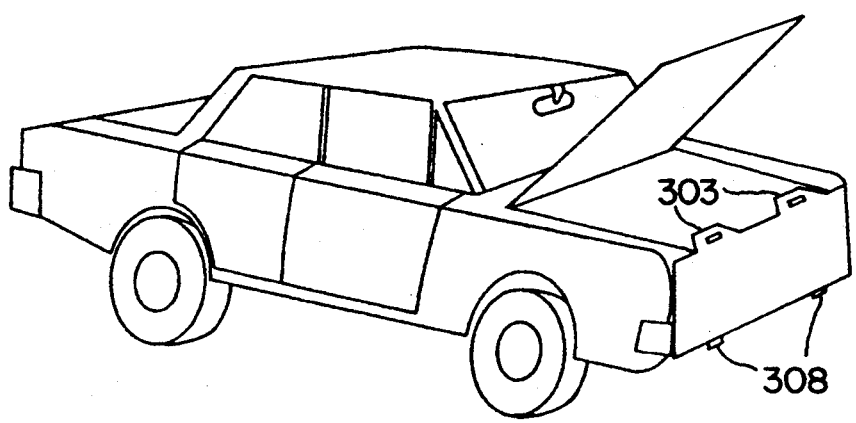
Figure 16C:
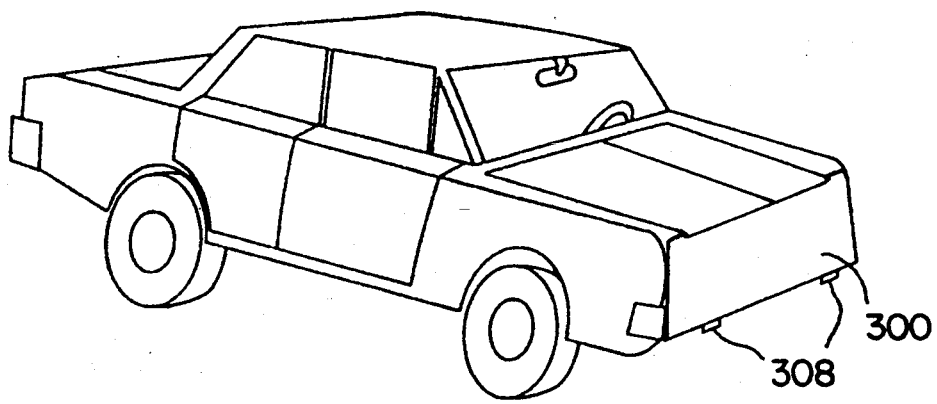

FIGS. 16A–16C illustrate the manner in which the cover device 300 may be attached to a front end of a motor vehicle. While FIGS. 16A–16C illustrate placing the cover on the front end of the motor vehicle, a similar, or an analogous, procedure may be utilized for placing the cover device 300 on the rear end of the motor vehicle.

With reference to FIG. 16A, the cover device 300 may be utilized by opening the motor vehicle hood 23. The cover device 300 is then connected, via the connecting device 308, to the bottom portion of the bumper, as shown in FIG. 16A. Once the cover device 300 is secured to the bumper, the cover device 300 should be pulled tightly up, and across, the front end of the vehicle. The tapered top end regions 303 should then be placed inside the opened hood of the vehicle, as shown in FIG. 16B. It is important to note that the shape of the cover device 300 should be selected, and should be placed in the motor compartment so that the cover device 300, or the top end regions 303 thereof, do not interfere with the hood closing, locking or securing means. The hood 23 should then be closed on and over the cover device 300, as shown in FIG. 16C, thereby securing the cover device 300 to the motor vehicle.

When removal is desired, the owner or operator of the motor vehicle need only open the hood, remove the portion of the cover device 300 or top end regions 303 thereof from the motor compartment, pull the cover 300 from the front end of the vehicle and disconnect the connecting device 308 from the bottom of the bumper. The cover device 300 may then be shaken, brushed, or wiped clean and folded and stored for later use. In this manner, the cover device 300 may be utilized to protect the lights and/or grill on a vehicle front end and, therefore, provide for an easy and minimum effort clearing and cleaning of same.

The cover device 300 may be employed, in the same, or in an analogous, manner as described above, on the rear end of a motor vehicle so as to protect the lights located thereon. Again, the cover device 300 should be designed and/or placed within the trunk compartment so as to not interfere with the trunk closing and locking mechanism or means of same.

Although described and illustrated as having certain various embodiments and shapes, the cover device of the present invention may take any form, shape, or size and may be specifically designed and constructed for any one or more of the wide variety of motor vehicles which are presently in existence and which may appear in the future.

While the present invention has been illustrated and described in various preferred embodiments, such are merely illustrative of the present invention and are not to be construed as limitations thereof. Accordingly, the present invention includes all modifications, variations and/or alternate embodiments with the scope of the present invention limited only by the claims which follow.

What is claimed is:

1. A combination, which comprises:
a motor vehicle window; and
a cover device for said motor vehicle window, which comprises:
means for covering an entirety of said window and a portion of at least one of a motor vehicle roof and a motor vehicle hood, adjacent said window, wherein said covering means comprises:
an external shell, wherein said external shell further comprises:
a central region; and
at least two end regions,
wherein said cover device further comprises:
at least two handles, wherein said at least two handles are attached to said covering means,
wherein each of said at least two end regions has a trapezoidal shape, and further wherein said covering means is at least one of closable and securable inside at least one of a motor vehicle door, window and passenger compartment.

2. The combination of claim 1, wherein said covering means is at least one of flexible and pliable.

3. The combination of claim 1, wherein said covering means is constructed of at least one of plastic, reinforced plastic, vinyl and canvas.

4. The combination of claim 1, wherein said at least two handles are constructed of at least one of plastic, reinforced plastic, vinyl, canvas, wood and metal.

5. The combination of claim 1, wherein said cover device further comprises:
a lining which is attached to said covering means.

6. The combination of claim 1, wherein said cover device further comprises:
means for connecting said at least two handles with one another.

7. The combination of claim 1, wherein said said cover device further comprises:
means for securing said cover device to at least one of an external portion and a component of the motor vehicle.

8. The combination which comprises:
a motor vehicle window; and
a cover device for said motor vehicle window, which comprises:
means for covering an entirety of said window and a portion of at least one of a motor vehicle roof and a motor vehicle hood, adjacent said window, wherein said covering means comprises:
an external shell, wherein said external shell further comprises:
a central region; and
at least two end regions,
wherein said cover device further comprises:
at least one handle, wherein said at least one handle is attached to said covering means,
wherein said covering means is at least one of closable and securable inside at least one of a motor vehicle door, window and passenger compartment.

9. The combination of claim 8, wherein said at least one handle is connected to said covering means at at least one of said at least two end regions.

10. The combination of claim 8, wherein said covering means is at least one of flexible and pliable.

11. The combination of claim 8, wherein said covering means is constructed of at least one of plastic, reinforced plastic, vinyl and canvas.

12. The combination of claim 8, wherein said at least one handle is constructed of at least one of plastic, reinforced plastic, vinyl, canvas, wood and metal.

13. The combination of claim 8, wherein said cover device further comprises:
a lining which is attached to said covering means.

14. The combination of claim 8, wherein said cover device further comprises:
means for connecting said at least two end regions with one another.

15. The combination of claim 8, wherein said cover device further comprises:
means for securing said cover device to at least one of an external portion and a component of the motor vehicle.

16. The combination of claim 15, wherein said securing means is at least one of a magnetic strip, a magnet, a suction device, a strap and a strap device.

17. The combination of claim 8, wherein said at least one handle has a greater cross-sectional width than at least one of said external shell, said central region and said at least two end regions.

18. The combination of claim 13, wherein said lining is comprised of at least one of a cloth, a linen fiber, a flannel, a chamois and a non-stick material.

19. A combination, which comprises:
a motor vehicle window; and
a cover device for said motor vehicle window, which comprises:
means for covering an entirety of said window and a portion of at least one of a motor vehicle roof and a motor vehicle hood, adjacent said window, wherein said covering means comprises:

an external shell, wherein said external shell further comprises:

a central region; and at least two end regions, wherein each of said at least two end regions has a trapezoidal shape, wherein said cover device further comprises:

at least two handles, wherein one of said at least two handles is attached to said covering means at each of said at least two end regions, wherein said covering means is at least one of closeable and securable inside at least one of a motor vehicle door, window and passenger compartment.

20. The combination of claim 19, wherein said covering means is at least one of flexible and pliable.

* * * * *

UNITED STATES PATENT AND TRADEMARK OFFICE
CERTIFICATE OF CORRECTION

PATENT NO. : 5,415,214
DATED : May 16, 1995
INVENTOR(S) : Robert R. Bock and Raymond A. Joao It is certified that error appears in the above-indentified patent and that said Letters Patent is hereby corrected as shown below:

Column 14, line 8 "The combination which comprises:" should read -- A combination, which comprises: --.

Signed and Sealed this

Fourth Day of July, 1995

Attest:

BRUCE LEHMAN

*Attesting Officer*  *Commissioner of Patents and Trademarks*